SIGNAL CYCLING DEVICE

Filed April 13, 1950

INVENTORS.
John Presper Eckert Jr.
Albert A. Auerbach
by George V. Eltgroth
Attorney INVENTORS.
John Presper Eckert Jr.
Albert A. Auerbach
by George V. Eltgroth
Attorney INVENTORS.
John Presper Eckert Jr.
Albert A. Auerbach
by George V. Eltgroth
Attorney

TIMING DIAGRAM

INVENTORS.
John Presper Eckert Jr.
Albert A. Auerbach
by George V. Eltgroth
Attorney Aug. 24, 1954 J. P. ECKERT, JR., ET AL 2,687,473

SIGNAL CYCLING DEVICE

Filed April 13, 1950 5 Sheets-Sheet 5

INVENTORS.
John Presper Eckert Jr.
Albert A. Auerbach
by George V. Eltgroth
Attorney Patented Aug. 24, 1954

2,687,473

UNITED STATES PATENT OFFICE 2,687,473

SIGNAL CYCLING DEVICE

John Presper Eckert, Jr., Mount Airy, and Albert A. Auerbach, Philadelphia, Pa., assignors, by mesne assignments, to Remington Rand, Inc., New York, N. Y., a corporation of Delaware Application April 13, 1950, Serial No. 155,628

14 Claims. (Cl. 250—27)

This invention relates to a frequency and phase converter and more particularly to a circuit selective timing device.

Heretofore delay lines have been utilized in conjunction with pulse generators for the purpose of controlling a plurality of channels or devices. This invention provides for the circulation of a signal impulse in a signal loop comprising a delay line, a pulse forming regenerator and a timing gate, so that once a signal impulse enters the signal loop it continues to circulate therein until the loop is cleared. Provision is made to time said signal impulse each time it completes a circuit of the signal loop thereby maintaining a high degree of precision in circuit operation. When used for selective gating or selective sequential circuit activation, it is not necessary to utilize a pulse train or other complex signal configuration, but a single preferably rectangular impulse. Absolute timing accuracy is achieved by the provision of signal conditioned circuits which are activated only upon the coincidence of a timing impulse and circulating (circuit selecting) impulse, which will be described in detail below.

Accordingly, it is a primary object of the present invention to provide a new and improved device for selectively supplying certain specific timing impulses to selected electrical circuits.

Another object of the invention is to provide a new and improved device for the control of a plurality of channels or devices.

Yet another object of the invention is to provide a new and improved device for frequency conversion.

Still another object of the invention is to provide a new and improved phase selecting device.

A further object of the invention is to provide a new and improved device which delivers a plurality of impulses of a selected duration, frequency and phase relationship.

Another object of the invention is to provide a new and improved signal cycling device having its operation easily and accurately initiated.

Figures 1, 2, 4:
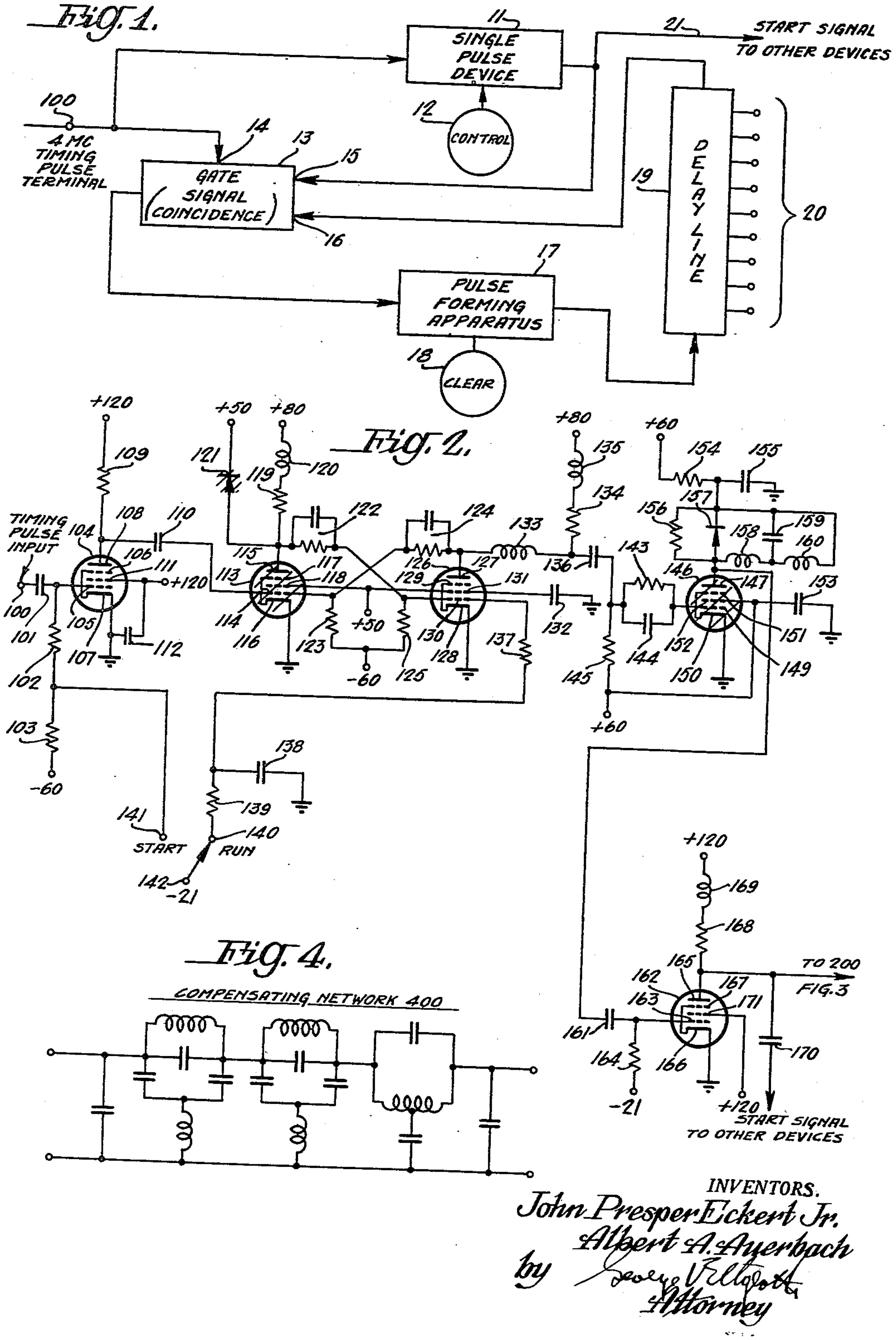
Figures 3, 7A, 7B, 7C:
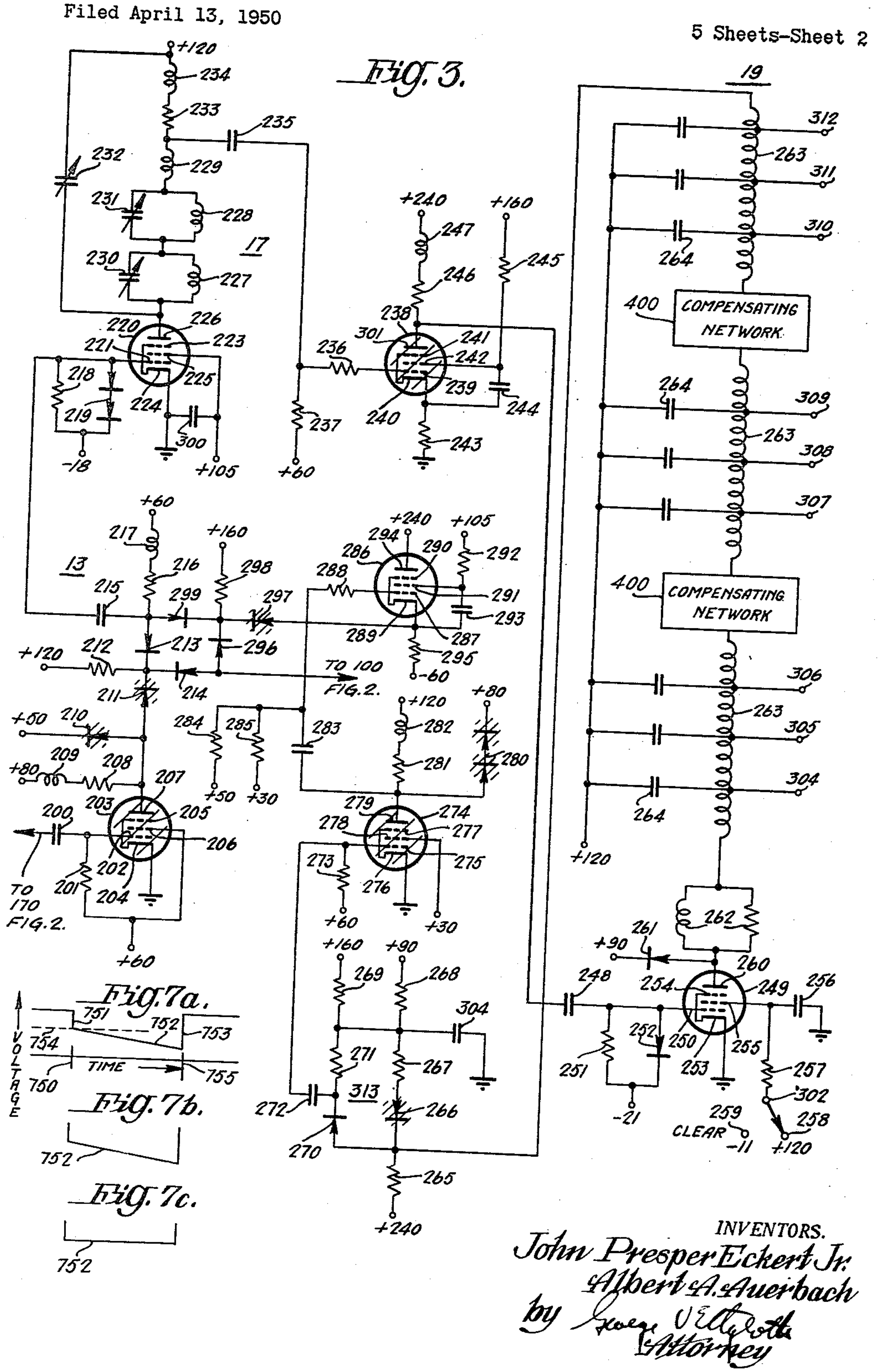

Other objects and advantages of the invention will be more readily understood if the description is read in conjunction with the following figures, in which:

Figure 1 illustrates in block form a signal cycling device embodying the invention, Figure 2 illustrates schematically a portion of the signal cycling device utilized to initiate its operation, Figure 3 illustrates schematically the signal loop of the signal cycling device, Figure 4 illustrates schematically a compensating network shown in block form in Figure 3.

Figure 5:
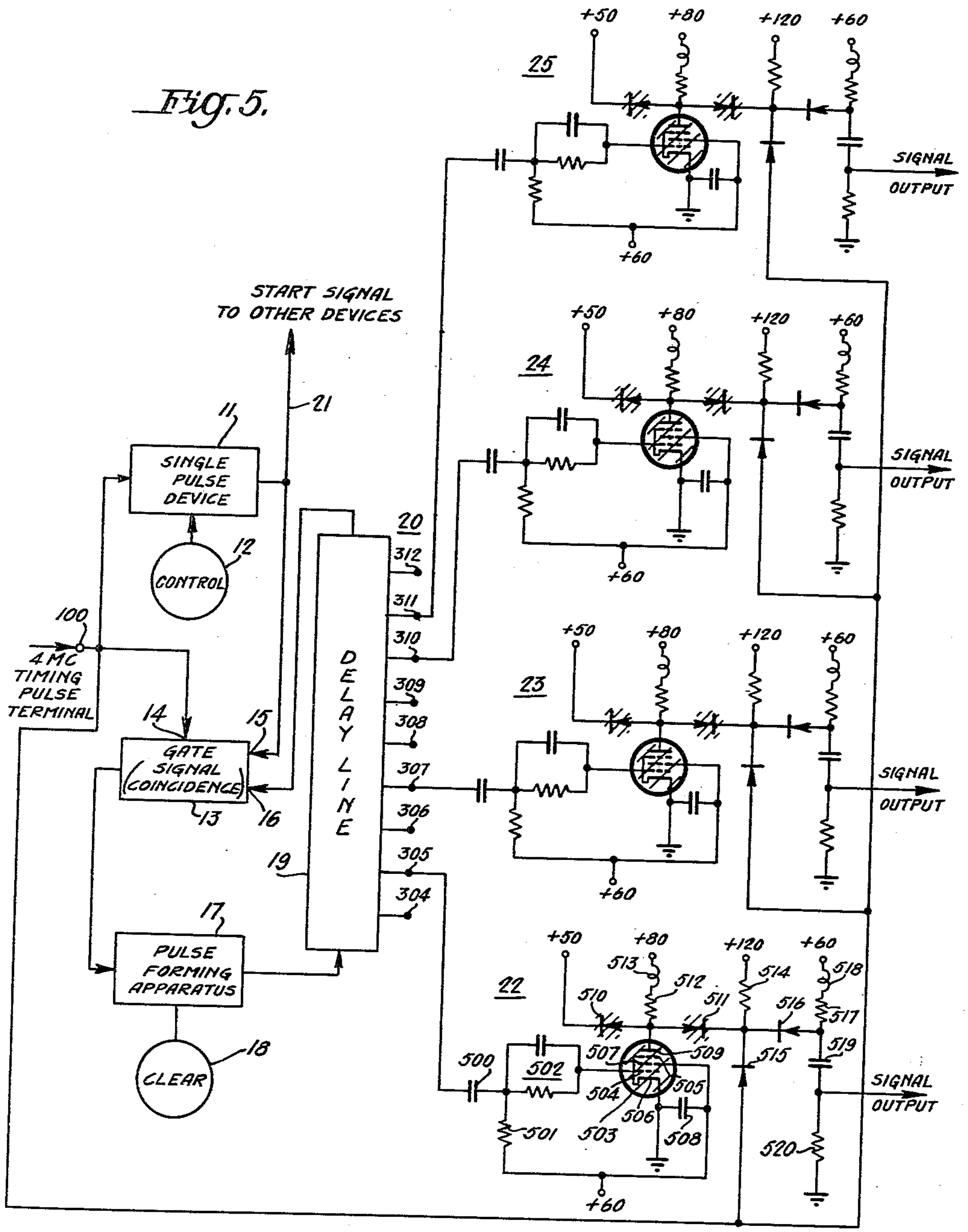
Figure 6:
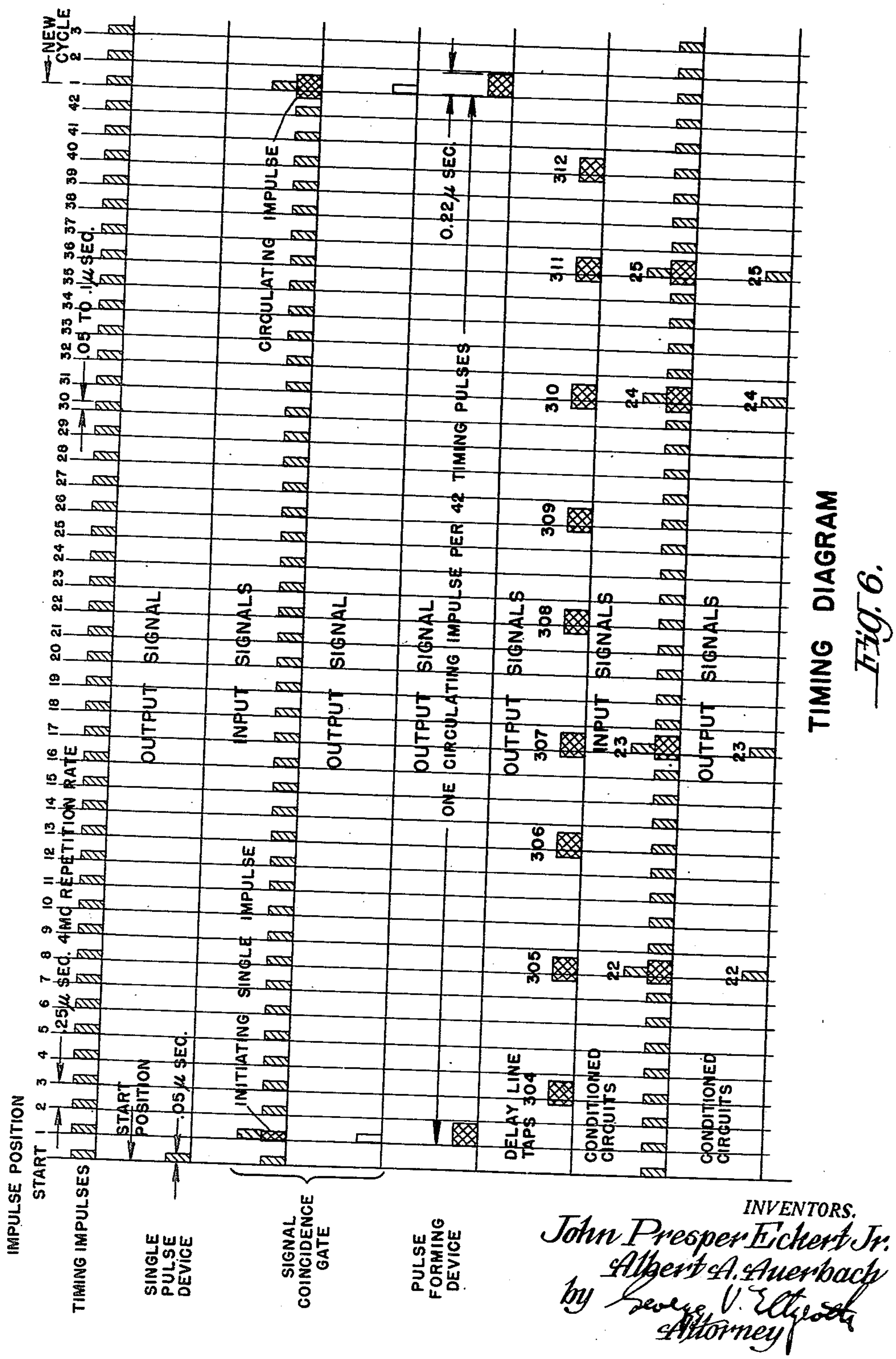
Figure 8:
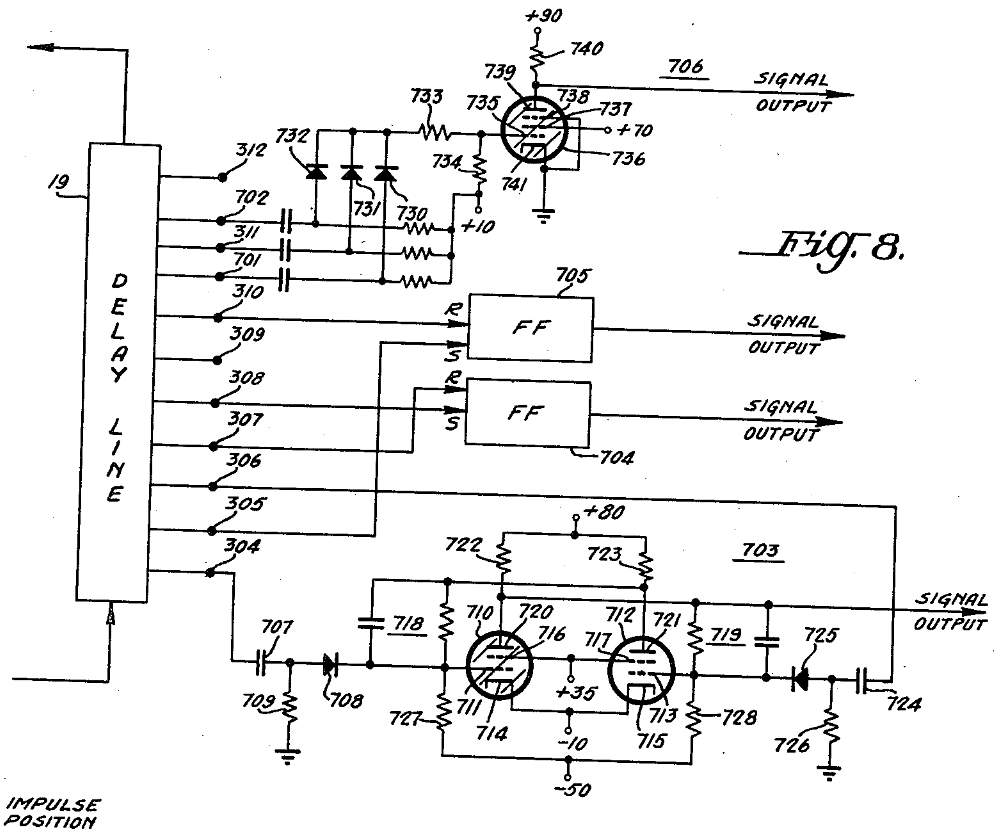
Figure 9:
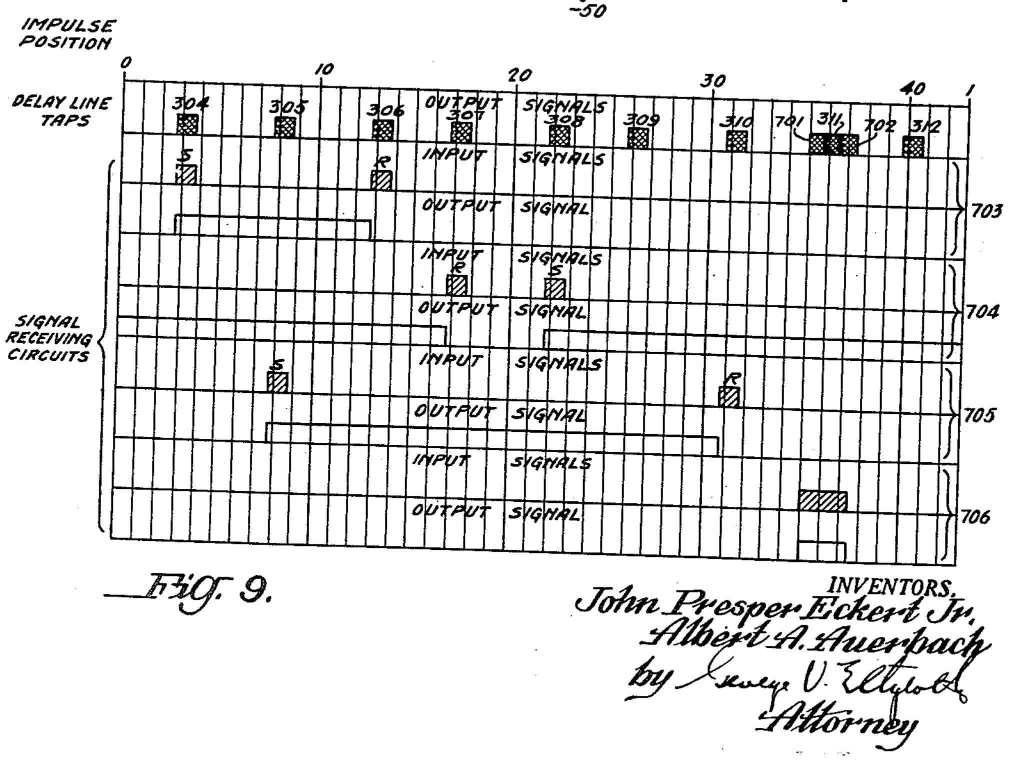

Figure 5 illustrates the signal cycling device in block form and a number of signal receiving circuits associated therewith in schematic form, Figure 6 is a timing diagram, illustrating the signals found in various parts of the signal cycling device, Figures 7*a*, 7*b* and 7*c* illustrate voltage-time waveforms characteristic of impulse driven transmission lines, Figure 8 illustrates diagrammatically several of the modes by which signal receiving circuits may be associated with the delay line portion of a signal cycling device, and Figure 9 is a timing diagram illustrating the signals found in various parts of the apparatus shown in Figure 8.

Referring now to the drawings which illustrate a particular embodiment of this invention, in which like parts are referred to by like reference characters and values of potential are given for purposes of illustration only and not in order to limit the scope of the invention, Figure 1 shows in block form the cycling unit containing a single pulse device 11 which is linked to a control device 12 and has its input connected to a timing pulse terminal 100 and its output delivered to a coincidence signal gate 13 at the input terminal 15 and to any other equipment desired through the lead 21. The said signal coincidence gate 13 is also connected to signal terminal 100 at the input terminal 14. A pulse forming apparatus 17 linked to a signal clearing device 18 receives a signal output from the signal coincidence gate 13 and delivers it to a delay line 19 which is returned to said signal coincidence gate 13 at the input terminal 16. The said delay line 19 has a plurality of taps 20 along its length which connect with a set of signal conditioned circuits 22, 23, 24 and 25 (shown in Figure 5).

The cycling unit is started by means of the control device 12 which allows a single impulse to arrive at terminal 15 of gate 13 in coincidence with a timing impulse at input 14 coming directly from the signal terminal 100 which delivers impulses with a repetition rate of 4 megacycles per second having an impulse duration of .05 to .1 microseconds. The gate 13 delivers a signal to the pulse forming apparatus 17 upon the coincidental appearance of signals at input terminals 14 and 15 of gate 13. The pulse forming apparatus 17 is of a type developing a rectangular impulse of a predetermined width in response to an input signal. The rectangular impulse passes along the delay line 19 successively activating the taps 20 along its path and finally appears at the input terminal 16 of the gate 13. This impulse appearing at terminal 16 is retimed by the coincidence signal gate 13 which will not pass the signal until a timing impulse appears on its terminal 14; when this does occur, that is, the coincidence of signals appearing on terminals 14 and 16, a signal is delivered to the pulse forming apparatus 17 and the cycle just described is indefinitely repeated.

It may, therefore, be seen that once an impulse is delivered to the gate 13 at terminal 15 a signal impulse is caused to circulate indefinitely in a loop comprising the signal coincidence gate 13, the pulse forming apparatus 17, and the delay line 19. A device 18 is provided for the purposes of clearing the circulating signals from the said loop at such time when this may be desirable. A signal may again be caused to circulate in the said loop by utilizing the control device 17 linked to the single pulse device 11 as already previously described.

In this invention, a delay line interposing any period of delay and a timing impulse of any repetition rate may be utilized, if provision is made for the coincidental appearance of a signal from the delay line and a timing impulse at the signal coincidence gate 13. The signal from the delay line should appear at the gate 13 slightly before the leading edge of the timing impulse, so that proper timing may be effectuated; thereby the circulating signal is effectively controlled by the timing impulses. The equipment may be designed so that the signal passes once around the circulating loop for an integral number of timing impulses.

Referring now to Figure 2 for greater detail, a timing pulse input terminal 100 excited by positive-going timing impulses having a plus 58 volt base level and an amplitude of 20 to 30 volts with a repetition rate of 4 megacycles per second and a pulse duration of .05 to .1 microseconds, is coupled to the control grid 105 of a gate valve 104 by means of a capacitor 101. The control grid 105 of gate valve 104 is negatively biased by returning the grid resistors 102 and 103 to a negative potential of −60 volts. The junction point of said resistors 102 and 103 is linked to a starting terminal 141 which may be returned to a negative 21 volt potential through a start control switch 142. The screen grid 111 of gate valve 104 is directly returned to a positive potential of 120 volts and returned to ground through a by-pass capacitor 112, the suppressor grid 106 is connected to cathode 107 which is grounded; the anode 108 is returned to a positive potential of 120 volts through an anode resistor 109 and also excites the control grid 114 in a normally conducting valve 113 of a single pulse flip-flop circuit, through a coupling capacitor 110.

The aforementioned single pulse flip-flop circuit is comprised of valves 113 and 126 which have their control grids 114 and 130 respectively crossconnected to their anodes 127 and 115 through a related parallel resistor-capacitor combination 124 and 122, the cathode and suppressor grid of each, 116, 117, and 128, 129, are connected to ground potential, and the screen grids 118 and 131 are directly returned to a positive potential of 50 volts and returned to ground by means of a by-pass capacitor 132. The control grids 114 and 130 are negatively biased by being returned to a negative potential of 60 volts through grid resistors 123 and 125 respectively. The anode 115 of said valve 113 is maintained at no less than a positive potential of 50 volts by connection to the cathode of a normally conducting crystal diode 121 whose anode is connected with a positive 50 volt bus, and is returned to a positive potential of 80 volts through the series connected anode resistor 119 and compensating inductor 120. The anode 127 of valve 126 is also returned to a positive potential of 80 volts through the series connected delay inductor 133, anode resistor 134 and compensating inductor 135. The control electrode 130 of said valve 126 is also connected through a resistor 137 to a grounded capacitor 138 which is in parallel with a resistor 139 connecting to terminal 140 of said two-position start control switch 142 whose movable contact returns to a negative potential of 21 volts.

In operation, the timing pulse train on input terminal 100 is applied to the control grid 105 of the normally nonconducting gate valve 104. The minus 60 volt bias potential on said control grid 105 prevents conduction through the gate valve 104 and the input coupling capacitor 101 prevents the transfer of the plus 58 volt base level. When it is desired to initiate operation of the signal cycling device, the start control switch 142 is transferred to a position contacting said starting terminal 141, reducing the control grid bias on control grid 105 to minus 21 volts so that the next positive-going impulse appearing on input terminal 100 develops an anode current surge in gate valve 104 producing a negative-going impulse which is applied to the control grid 114 of the normally conducting valve 113 in the single pulse flip-flop circuit. Conduction through said valve 113 is now cut off and transferred to valve 126. This transfer of conduction results when a negative impulse is applied to the control grid 114 of the normally conducting valve 113, because this valve 113 becomes nonconductive causing its anode 115 to swing more positive to transmit a positive impulse to the control grid 130 of the normally nonconducting valve 126, whereupon this valve 126 becomes conductive. When valve 126 becomes conductive, the potential on its anode 127 swings less positive to maintain a negative cutoff potential on the control grid 114 of said valve 113. The state of the single pulse flip-flop is maintained until it is reset to its normal state by setting the control switch 142 to contact terminal 140, causing a negative voltage to be placed on control grid 130 of normally nonconducting valve 126 resulting in its becoming nonconductive and in valve 113 becoming conductive in the manner described previously in detail.

A buffer pulse-forming valve 146 has its control grid 149 coupled to the anode 127 of said normally nonconducting valve 126 of the single pulse flip-flop by means of a series connected signal delay inductance 133, a coupling capacitor 136 and a parallel combination of a resistor 143 and a capacitor 144. The said grid 149 is returned to a positive potential of 60 volts through the said combination of resistance and capacitance 143 and 144 in series with a resistor 145; the screen grid 152 is directly connected to a positive potential of 60 volts and is grounded through a by-pass capacitor 153. The cathode 150 and the suppressor grid 151 of said buffer pulse former valve 146 are connected to ground; the anode 147 is maintained at a positive potential by being connected to the cathode of a crystal diode 157 which connects to a positive potential of 60 volts through a limiting resistor 154 which charges a grounded capacitor 155. The said crystal diode 157 has connected across it a resistor 156 of the value required to terminate with its characteristic impedance a short-circuited transmission line made of the combination of the inductors 158, 160, and the capacitor 159. The anode 147 is also coupled to the control grid 163 of a coupling valve 162 by means of a capacitor 161.

The said control grid 163 of said coupling valve 162 is biased negatively by being returned to a minus 21 volt potential by means of a grid resistor 164. The cathode 166 and suppressor grid 167 of the said coupling valve 162 are both returned to ground potential; the screen grid 171 is directly linked to a positive potential of 120 volts and the anode 165 is returned to a positive potential of 120 volts through an anode resistor 168 and a compensating inductor 169. The anode 165 of coupling valve 162 is also connected to the control grid 202 of an input signal electrode valve 203 shown in Figure 3, by means of a coupling capacitor 200.

When conduction is transferred to the normally non-conducting valve 126 of the single pulser flip-flop, a negative impulse is transmitted to the succeeding buffer pulse forming valve 146 which is normally conductive causing it to become momentarily nonconductive. Due to the normally conductive state of the buffer pulse former valve 146 the transmission line in its anode circuit contains stored energy although there is no substantial voltage drop across it. At the instant valve 126 is cut off, the current increment acting through the surge impedance of the transmission line composed of inductors 158, 160, and capacitor 159, develops a positive-going impulse which persists through the current discontinuity and is terminated only after a positive impulse has traveled to the short-circuited end of the said transmission line and is returned 180° out of phase as a negative impulse to the anode 147. A characteristic terminating impedance 156 prevents reflection of said negative impulse reaching the anode end of the said transmission line. The transmission line is not activated when the buffer pulse forming valve 146 becomes conductive again, or when a positive impulse is delivered to the control grid 149 at the time the single pulser flip-flop is reset causing the anode 127 of the normally nonconductive valve 126 to swing more positive. This is accomplished by said crystal diode 157 which keeps the input ends of the said transmission line at substantially the same potential when the said buffer pulse forming valve 146 becomes conductive or has its conductivity increased.

The coupling valve 162, which is normally biased to cutoff, is made conductive by a positive-going impulse derived from the anode 147, when the said buffer pulse forming valve 146 is momentarily cut off. Because of the timed constant of the coupling capacitor-resistor network 161, 164, the control grid 163 of coupling valve 162 remains positive until the negative reflected impulse is received from said transmission line at the anode 147, driving the control grid 163 negative and the coupling valve 162 to its normal nonconducting state. Thus, a resulting negative impulse of approximately .05 microseconds duration may be derived from the anode 165 of said coupling valve 162. This impulse is coupled by means of capacitor 170 to other equipment, not shown, and by a capacitor 200 to the control grid 202 of an input signal valve 203 shown in Figure 3.

The said input signal valve 203 is normally conductive, having its control grid 202 returned to a positive potential of 60 volts by means of a grid resistor 201 and its screen grid 206 directly returned to the same potential. The suppressor grid 205 and the cathode 204 of said input signal valve 203 are connected directly to ground; the anode 207 is returned to a positive potential of 80 volts through an anode resistor 208 and a compensating inductor 209 and is prevented from becoming less positive than 50 volts by being connected to the cathode of a crystal clamping diode 210 which has its anode joined to a positive potential of 50 volts. The anode 207 is also connected to the cathode of a normally conducting crystal signal transferring diode 211 which has its anode returned to a positive potential of 120 volts through a resistor 212. The anode of a crystal timing diode 214 is likewise connected to the said 120 volt potential source through the same resistor 212 having its cathode returned to the timing pulse input terminal 100 shown in Figure 2; in a like manner the anode of a crystal buffer diode 213 is connected to the said positive potential of 120 volts through resistor 212 having its cathode returned to a positive potential of 60 volts by means of a resistor 216 and a compensating inductor 217 and is linked by a coupling capacitor 215 to the control grid 221 of a pulse forming valve 220.

Considering the operation of the input signal valve 203, the normally conducting crystal clamping diode 210 which is returned to plus 50 volts serves as a clamp to eliminate the effect of changes in anode current with increasing age of said input signal valve 203 and by placing a lower limit upon the anode signal excursion. The normally conducting crystal transferring diode 211 becomes nonconductive passing conduction to the normally nonconducting crystal timing diode 214 when the voltage on the anode 207 swings positively due to the cutoff of the input signal valve 203. Now, upon the occurrence of a timing impulse at the crystal timing diode 214 causing it to become nonconductive, a positive impulse is passed through the normally nonconducting crystal buffer diode 213 and coupling capacitor 215 to provide a signal input to the pulse forming valve 220. It should be noted that a positive base potential of 58 volts is supplied to the cathode of crystal timing diode 214 resulting in a peak voltage of 80 to 90 volts upon the occurrence of a timing impulse.

The control grid 221 of the normally nonconducting pulse forming valve 220 is biased negatively by being returned to a negative potential of 18 volts by means of a grid resistor 218 which has connected across it, a series pair of crystal diodes 219 having their anode end joined to said negative potential. The suppressor grid 223 and the cathode 224 of said pulse forming valve 220 are both returned to ground; the screen grid 225 is directly returned to a positive potential of 105 volts and is by-passed to ground by means of a capacitor 300; the anode 226 is returned to a positive potential of 120 volts through a tuned network comprising a parallel combination of a capacitor 230 and inductor 227 joined to a parallel combination of a capacitor 231 and inductor 228 in series with an inductor 229, a resistor 233 and a compensating inductor 234 all in parallel with a tuned capacitor 232.

The control grid 239 of a coupling valve 238 is joined to the said tuned network at the junction point of inductor 229 and resistor 233 by means of a coupling capacitor 235 and a resistor 236. The said control grid 239 of the normally conducting coupling valve 238 is positively biased by connection to a positive potential of 60 volts through said resistor 236 and a grid resistor 237. The screen grid 242 of said coupling valve 238 is maintained positive by returning through a resistor 245 to a positive potential of 160 volts and is connected by means of a by-pass capacitor 244 to the cathode 240 and the suppressor grid 241, which are returned to ground through a cathode resistor 243; the anode 301 is connected to the control grid 250 of a delay line driver valve 249, by means of a coupling capacitor 248.

The control grid 221, of the pulse forming valve 220, is prevented from becoming more negative than minus 18 volts by the crystal diodes 219, so that when a positive impulse appears thereon, this normally nonconducting valve 220 becomes momentarily conductive, activating the rectangular pulse forming network in its anode circuits. The said pulse forming network is of a type known in the electronic art which, when tuned for a specific signal repetition rate, develops a rectangular impulse of a predetermined duration in response to a momentary interruption of the current therethrough, which in this case results in a negative-going impulse of 0.22 microsecond duration which is transferred by the coupling valve 238 as a positive impulse to the control grid 250 of the delay line driver valve 249.

The said delay line driver valve 249 is normally nonconducting having its control grid 250 connected to a negative bias potential of 21 volts by means of a grid resistor 251, which has a crystal restoring diode 252 connected in parallel having its anode linked to the said negative potential. The cathode 253 linked to the suppressor grid 254 of the said delay line driver valve 249, is connected to ground potential; the screen grid 255 is by-passed to ground by a capacitor 256 and is connected to a control switch 302 which contacts either a terminal 258 bearing a positive potential of 120 volts or a clear terminal 259 bearing a negative clearing potential of 11 volts. The anode 260 is linked to a positive clamping potential by a crystal clamping diode 261 which has its anode connected to positive potential source having a voltage determined by later reviewed considerations, and is also connected to a positive potential of 240 volts through a parallel inductor-resistor combination 262, a delay line 19, composed of a plurality of mutually coupled series connected inductors 263 connected at their junction to capacitors 264, which all have one side returned to a positive potential of 120 volts and an anode resistor 265. The said delay line 19 is provided with a series of tap connections 304, 305, 306, 307, 308, 309, 310, 311, and 312 along its length, for the delivery of signals to apparatus specifically shown in Figure 5.

The junction point of the delay line 19 and said anode resistor 265, is joined to a pair of parallel connected crystal diode resistor branches 313 by connecting to the anode of the normally conducting diode 266 and the cathode of the normally nonconducting diode 270 each of which is respectively series connected to a load resistor 267 and a load resistor 271 connecting in a junction point which is returned to a positive potential of 160 volts through a voltage divider resistor 269 and to a potential of 90 volts through a voltage divider resistor 268, and by-passed to ground potential through a hum-filtering capacitor 304. A coupling capacitor 272 joins the anode of said diode 270 to the control grid 275 of a coupling valve 274.

In operation, the delay line driver valve 249 has its control grid 250 maintained, by means of the restorer diode 252, at a potential which cannot become more negative than a potential of minus 21 volts, so that when a positive rectangular impulse is transmitted thereto, the said valve 249 will, in response, normally become conductive. When the control switch 302 is placed in the clear position, the delay line driver valve 249 does not become conductive in response to positive signals upon its control grid 250, thereby preventing the transmission of signals to the delay line 19. The parallel inductor-resistor 262 combination prevents ringing or oscillations in the anode circuit of said delay line driver valve 249, allowing a signal of substantially rectangular wave form to appear in this circuit in response to a positive rectangular impulse on the control grid 250.

The anode voltage excursion of the driver valve 249 is limited to the lower level of 90 volts by the normally non-conducting crystal clamping diode 261 and to an upper level dependent upon the voltage drop through the anode resistor 265. In the foregoing discussion, the connection of the clamping diode 261 between the anode 260 of the valve 249, and a potential of approximately 90 volts has been mentioned. The purpose of this clamp is to shorten the time between the arrival of a positive-going impulse at the control grid 250 of the valve 249 and the development of the maximum negative-going excursion at the anode 260. A consideration of the diagrams in Figure 7 will make clear the requirement for the diode 261 and the manner of selecting the potential to which it is returned. Referring now to Figure 7*a*, it is assumed that a positive-going impulse is applied to the control grid 250 at a time 750. The resulting anode current surge, taken in conjunction with the surge impedance of the delay or transmission line 19, produces an immediate voltage change indicated by the negative-going stroke 751 across the line 19. The anode current continues to flow, however, and as it is propagated down the line, passes successively through section after section thereof. Each of these sections has an appreciable resistance, and as the current traverses additional sections, the anode 260 becomes progressively more negative by the amount of the additional drop contributed, as indicated by the section 752 of the voltage-time characteristic. At the time 755, the control electrode 250 returns to cut-off potential, interrupting the flow of anode current, permitting the anode potential to return to its rest value along the positive-going stroke 753.

Inspection of the Figure 7*a* reveals that the negative excursion of the anode 260 continues during the presence of the positive-going grid excitation impulse, whereby the time required for the anode 260 to reach the maximum negative excursion is very considerable. Without the diode 261, the form of the voltage wave available from the tap 304, for example, would be approximated by Figure 7*b*. However, by clamping the anode 260 against further excursion at the voltage level indicated by the dashed line 754 in Figure 7*a*, the time required for the signal to attain its final value is greatly reduced, through the elimination of the sloping stroke 752. To perform this function, the diode 261 is provided, and returned to a potential which must be at least as positive as the remainder after the subtraction of the initial surge from the anode rest potential. The initial surge magnitude is, of course, determined by measurement or multiplying the anode current surge by the line surge impedance. A less positive clamping potential would permit a portion of the sloping stroke 752 to get through the circuits. A more positive clamping potential will do no harm to the general form of the impulses, but merely reduce the peak amplitude available.

The said negative impulse traverses the delay line 19 which interposes a delay of the magnitude desired. Compensating networks 400, which are shown in greater detail in Figure 4 to be composed of a network of capacitors and inductors, are interposed in the delay line 19 to correct the progressive wave form degradation suffered by the said negative impulse as it traverses the delay line 19.

Upon reaching the load end of the delay line 19, the negative impulse is impressed on the two parallel connected crystal diode resistor branches 313, resulting in the nonconduction of normally conducting diode 266 and the conduction of diode 270 which transmits a negative impulse to the control electrode 275 of coupling valve 274. The normally nonconductive state of crystal diode 270 provides clipping which prevents the transmission of undesirable impulses derived from hum effects and those resulting from line mismatch. Because one of the said pair of parallel diode resistor branches 313 is conducting when the other is nonconducting the function is also served of terminating the delay line 19 with its characteristic impedance to prevent signal reflection.

A coupling valve 274, which is normally conductive, has its control grid 275 biased positively by connection to a positive potential of 60 volts through a grid resistor 273, its screen grid 278 directly returned to a positive potential of 30 volts, and its cathode 276, which is linked to the suppressor grid 277, connected directly to ground. The anode 279 of said coupling valve 274 is returned to a positive potential of 120 volts by means of an anode resistor 281 through a compensating inductor 282, and has its negative voltage excursion limited by returning to a positive potential of 80 volts by connecting to the anode end of a pair of series connected crystal clamping diodes 280. The said anode 279 is also coupled to the control grid 287 of a circulating signal valve 286 by means of a series connected coupling capacitor 283 and grid resistor 288.

The control grid 287 of said circulating signal valve 286 is biased positively through the grid resistor 288, which connects to the voltage dividing resistors 284 and 285 which are returned, respectively, to the positive potentials of 50 volts and 30 volts. The anode 294 of said circulating signal valve 286 is directly linked to a positive potential of 240 volts; the screen grid 291 is returned to a positive potential of 105 volts through a resistor 292, and is coupled by means of a by-pass capacitor 293 to the cathode 289, which is joined to the suppressor grid 290 and returned to a negative potential of 60 volts through a cathode load resistor 295, and also returned to a positive potential of 160 volts through a normally conductive signal transferring crystal diode 297 and a resistor 298. The anode of a crystal timing diode 296 is also connected to the positive potential of 160 volts through said resistor 298 having its cathode directly returned to the timing pulse input terminal 100 shown in Figure 2. In a like manner, the anode of a buffer crystal diode 299 is connected to the positive potential of 160 volts through the same said resistor 298 having its cathode returned to a positive potential of 60 volts through the previously described resistor and inductor 216 and 217, respectively, and is also linked by means of the already described coupling capacitor 215 to the previously described pulse forming valve 220.

A negative impulse appearing at the control grid 275, of the coupling valve 274, results in a positive signal appearing at the control grid 287 of the circulating signal valve 286, causing this valve to become more conductive, which results in the cathode 289 swinging positively. This positive impulse is transmitted by means of said crystal signal transferring diode 297, the crystal buffer diode 299 and coupling capacitor 215 to the control grid 221 of the signal forming valve 220, under the same conditions and circumstances previously described with relation to the transmission of signals from the valve 203.

Thus it is seen, that once a pulse is fed into the signal circulating loop, comprising the signal coincidence gate 13, the pulse forming apparatus 17, and delay line 19, it is caused to circulate continuously, being retimed each time it makes a circuit with a delay line "*n*" pulse periods long, retiming being effected every "*n*th" timing impulse appearing at the input terminal 100. Signal circulation is terminated by applying control switch 302 to the clear position 259, whereupon no signal can enter the delay line 19 until such time when said switch 302 is returned to the positive 120 volt terminal 258 and the switch 142 (Figure 2) is placed in the start position contacting terminal 141, so that a pulse appearing on the terminal 100 may be passed into said signal circulation loop.

Figure 5 illustrates a group of signal conditioned circuits 22, 23, 24, and 25 used in association with said signal circulating loop by being operatively connected to taps 305, 307, 310, and 311 respectively, along the length of the signal delay line 19. The signal conditioned circuit 22, identical with the other said circuits 23, 24, and 25, comprises a normally conducting signal valve 503, having an input grid 504 connected to a tap 305 on the signal delay line 19, through a coupling capacitor 500 and a parallel capacitor-resistor combination 502, said input grid 504 being positively biased by connection to a positive potential of 60 volts through said parallel capacitor-resistor combination 502 and a grid resistor 501. The screen grid 507 of said signal valve 503 is directly connected to a positive potential of 60 volts, and is returned to ground potential by means of a by-pass capacitor 508; the suppressor grid 505 and the cathode 506 are directly connected to ground potential; and the anode 509 is returned to a positive potential of 80 volts through an anode resistor 512 and a compensating inductor 513. The said anode 509 is clamped to a minimum positive potential of 50 volts by means of a normally conducting crystal diode 510 having its anode returned to a positive potential of 50 volts; the said anode 509 is also connected to the cathode of a normally conducting crystal signal transferring diode 511, which has its anode returned to a positive potential of 120 volts through a resistor 514. A crystal timing diode 515 and a crystal buffer diode 516, both normally nonconducting, are likewise returned to a positive potential of 120 volts through the same resistor 514, the cathode of said crystal timing diode 515 being returned to the timing pulse terminal 100 shown in Figure 2. The cathode of said crystal buffer diode 516 is returned to a positive potential of 60 volts through a resistor 517 and a compensating inductor 518, and is returned to ground through a coupling capacitor 519 and a resistor 520, a signal output being obtained at the junction of said coupling capacitor 519 and said grounded resistor 520.

In operation, when a negative circulating pulse traveling along the delay line 19 reaches the tap position 305 coupled to the input grid 504 of said signal valve 503, this same valve 503 becomes nonconductive, thereby raising the anode potential above the minimum value of 50 volts and passing conduction to the normally nonconducting crystal timing diode 515. When a positive timing impulse is impressed upon the cathode of the crystal timing diode 515 stopping conduction therethrough, the voltage drop across the resistor 514 is decreased to a value which allows a positive signal impulse to be transmitted through the crystal buffer diode 516 and then through the capacitor 519 to the signal output.

Thus it appears that a clocking or timing impulse is delivered at the signal output of conditioned circuit 22 (similarly circuits 23, 24, and 25) only at such times when a nonconducting period of the signal valve 503 coincides with a timing pulse. Thus, a clocking impulse may be provided for any selected pulse positions.

The versatility of a signal conditioned circuit 22 (similarly circuits 23, 24, and 25) may be easily seen from the diversity of methods by which the signal input to said signal valve 503 may be secured by attaching to different places and combinations of places along the signal delay line 19. A plurality of such signal conditioned circuits (22, 23, 24, 25) may be used to provide the selection of any number of specifically ordered impulses, in a series of timing pulses occurring during the period of circulation of a signal pulse (in this case 42 timing impulses per circulating signal pulse cycle), in any order desired, for distribution to a plurality of selected signal receiving circuits (not shown).

It should be noted that many other types of signal conditioned devices, for example, signal gating circuits and signal actuated flip-flop circuits, can be easily and readily adapted for use in connection with the said signal delay line 19, by those versed in the electronic art, to satisfy a great diversity of specific requirements. For example, it is apparent that frequency conversion with respect to timing impulses can be accomplished by connecting a plurality of signal receiving circuits which are not conditioned by timing impulses at equidistant points along the delay line 19 for actuation by a circulating signal (not necessarily rectangular), the frequency conversion ratio being directly dependent upon the number of signal receiving circuits, to wit, the number of signal receiving circuits divided by the number of timing impulses per circulating signal period. Equally apparent is the fact that a signal may be derived from the delay line 19 which coincides with a circulating signal timing impulse or is delayed in time from a timing impulse; thus by appropriately selecting the points of attachment of signal receiving circuits to the delay line 19, the signals derived may have any desired phase relationship to said circulating signal timing impulses or be displaced by a given time period from another derived signal.

Referring now to the timing diagram shown in Figure 6, the timing pulses appearing on the input terminal 100, 42 of which make up a signal circulating cycle, are .25 microseconds apart having an impulse width of .05 to 0.10 microseconds. The impulse delivered by the single pulse device 11, when the signal cycling device is started, also has a duration of substantially .05 microseconds and arrives at terminal 15 of the signal coincidence gate 13 slightly before the timing impulse in impulse position 1 is impressed on input terminal 14 of the said signal coincidence gate 13 (Figure 1). The required amount of delay for the initiating impulse from the single pulse device 11 to achieve this result is obtained by means of the signal delay inductor 133 shown in the anode circuit of flip-flop 126 in Figure 2. The coincidence of said starting impulse and timing impulse at impulse position 1 results in a signal output from the signal coincidence gate 13, which results in the output of a signal impulse at impulse position 1 which has a duration of 0.22 microseconds. This signal impulse passes through the delay line 19 (Figure 5), appearing at tap 304 during the third impulse position, tap 305 during the eighth impulse position, tap 306 during the thirteenth impulse position, and so forth, as indicated by the timing diagram. The signal impulse is then returned to the signal coincidence gate input 16 slightly before being retimed by a timing impulse to provide a signal impulse at the input of the pulse forming apparatus 17 to start a new circulating cycle at the impulse position 1.

Each of the conditioned circuits 22, 23, 24, and 25 has one of its inputs connected to a tap of the delay line 19 and the other input connected to the timing pulse terminal 100 shown in Figure 5. Each of the conditioned circuits provides an output signal only when a delay line signal and timing impulse appear simultaneously at their respective inputs. Thus the conditioned circuit 22 provides an output signal at the impulse position 8, the conditioned circuit 23 provides an output signal at the impulse position 17, the conditioned circuit 24 provides an output signal at the impulse position 31, and the conditioned circuit 25 provides an output signal at the impulse position 36. The timing diagram shows the several input and output signals for only one completed circulating cycle which is continuously repeated as long as the signal cycling device is in operation.

Figure 8 illustrates diagrammatically several other modes by which signal receiving circuits 703, 704, 705, and 706 may be connected with the delay line 19 of the signal cycling device. The tap 304 of delay line 19 is operatively connected to the control electrode 711 of the normally conductive valve 710 of the signal receiving circuit 703 by means of a coupling capacitor 707 through a crystal diode 708 having its anode joined to said control electrode 711 and its cathode returned to ground potential by means of a resistor 709. The cathode 714 of the normally conducting valve 710 and the cathode 715 of a normally nonconducting valve 712 in said signal receiving circuit 703 are directly returned to a negative potential of ten volts; the screen electrodes 716 and 717 are directly returned to a positive potential of 35 volts and the anodes 720 and 721 are respectively returned through load resistors 722 and 723 to a plus eighty volt bus. The anodes 720 and 721 are also crossconnected wtih the control electrodes 713 and 711 respectively of the valves 712 and 710 by means of resistor-capacitor combinations 719 and 718. The anode 720 is further connected to a signal output terminal. The control electrodes 711 and 713 are each biased negatively by connection to a minus fifty volt bus through respective grid resistors 727 and 728. The control electrode 713 of valve 712 is also coupled to the tap 306 of the delay line 19 by means of a coupling capacitor 724 through a crystal diode 725 having its anode linked to the control electrode 713 and its cathode returned to ground potential through a resistor 726.

When a negative impulse passing through the delay line 19 reaches the tap 304, a negative signal is impressed upon the control electrode 711 of the normally conducting valve 710 in the signal receiving circuit 703, causing this valve to become nonconductive. A positive-going impulse is produced upon the anode 720 of the valve 710 which is delivered to the signal output and through the capacitor-resistor combination 719 to the control electrode 713 of the normally nonconducting valve 712 causing this valve to become conductive giving rise to a negative-going impulse upon its anode 721 which reinforces the negative signal already upon the control electrode 711 of valve 710. Thus the valve 710 is maintained in a nonconductive state as long as the valve 712 remains conductive. This condition is altered only when the negative impulse traveling along the delay line 19 reaches the tap 306 and is impressed upon the control electrode 713 of the normally nonconducting valve 712, thereby returning it to its nonconductive state which results in the impression of a positive signal upon the control grid 711 of the valve 710 causing it again to resume its normally conductive state and terminating the positive signal impulse delivered to the signal output from the plate 720 of said valve 710.

The signal receiving circuit 704 which is a conventional flip-flop circuit, as is the signal receiving circuit 703, just described, is reset by a negative impulse in the delay line 19 appearing at the tap 307 and shortly thereafter set up by said impulse appearing at the tap 308 which connects to the setting terminal of the signal receiving circuit 704. Thus this circuit is connected to the delay line 19 in a manner which affords a signal output for the entire circulating signal period excepting the time during which the circulating impulse passes from the delay line tap 307 to tap 308.

The signal receiving circuit 705, also a conventional flip-flop, is set and reset by negative signals derived from the taps 305 and 310 respectively. The signal output of the circuit 705 corresponding in duration to the time elapsing for the passage of a circulating impulse from the tap 305 to the tap 310. The relationship of the signal output to the circulating signal cycle is also determined by the relative position of the taps delivering setting and resetting signals to said circuit.

The signal receiving circuit 706 derives its input signals from a plurality of closely spaced taps 701, 311, and 702 along the delay line 19 connected by individual coupling capacitors to the cathodes of crystal diodes 730, 731, 732, with their anodes, coupled through a resistor 733 to the control electrode 735 of the normally conducting valve 736 in said signal receiving circuit 706. The said control electrode 735 is biased positively by returning to a plus ten volt bus through a grid resistor 734, while the screen electrode 337 of said valve 736 is returned to a positive potential in the order of seventy volts and the suppressor electrode 738 and cathode 741 are returned directly to ground potential. The anode 739 in said normally conducting valve 736 is returned to a plus 90 volt bus through an anode resistor 740 and is conected to a signal output terminal.

The taps 701, 311, and 702 are spaced closely enough along the delay line 19 so that when a signal circulating impulse passes from one tap to the other the circulating impulse is impressed upon a following tap before it is removed from the preceding tap. In other words, the circulating impulse duration must be greater than the time required for said impulse to pass from one tap to the other such as from tap 702 to tap 311 or from tap 311 to 702. With these conditions met it is easily seen that a negative impulse is impressed upon the control electrode 735 beginning with the receipt of a negative circulating impulse by the tap 701 and endures until the removal of said negative impulse passing the tap 702. By selecting an appropriate number of taps at selected locations along the delay line 19 it is possible to obtain a signal input to the signal receiving circuit 706 of any given duration, approaching a circulating signal cycle and having any position in a phase sense within the circulating signal period. The diodes 730, 731, and 732 prevent the short-circuiting of the delay line 19 between its taps 701, 311, and 702. When a negative signal is impressed upon the control grid 735, the normally conducting valve 736 becomes nonconductive, causing the voltage upon its anode 739 to rise, thereby delivering a positive-going impulse to the signal ouput, which impulse is terminated upon the removal of the negative impulse on the control electrode as occurs when the circulating impulse in the delay line 19 leaves the tap 702.

In summary, output signals of selected duration, said duration maximum being limited by the given circulating signal period, may be easily accomplished by first setting up and then resetting a flip-flop circuit by means of "setting" and "resetting" signals derived respectively at two differing points along the delay line 19, the duration of the signal produced by said flip-flop circuit being dependent upon and equal to the delay time imposed by the delay line 19 to a circulating signal between the points of attachment thereto. Output signals having durations beyond that of a circulating signal duration are obtainable by deriving the input to a signal receiving circuit from several locations along the delay line 19 sufficiently closely spaced to deliver an uninterrupted signal output therefrom.

Referring now to Figure 9 which is a timing diagram illustrating the signals found in the various parts of the apparatus shown in Figure 8, the signal outputs appearing at the delay line taps are shown with respect to their occurrence during a circulating signal period, as referred to a reference impulse position, there being space for 42 impulses during each circulating signal period. It should be noted that the taps 701, 311, and 702 are spaced sufficiently closely with respect to a circulating impulse duration to cause the output from said taps to overlap slightly. It should be further noted that such overlapping may be achieved with respect to taps such as 308, 309, 310 by sufficiently increasing the duration of a circulating signal impulse without the need of changing their positions along delay line 19. It may be observed that the signal receiving circuit 703 derives its setting and resetting signals from the delay line taps 304 and 306, respectively; its output signal being initiated by the receipt of the setting signal and terminated upon the receipt of the resetting signal. In a like manner, the signal receiving circuit 704 is shown to receive a resetting signal from the delay line tap 307 and a setting signal from tap 308, thus initiating a signal output upon the receipt of a setting signal which continues until it is terminated by a resetting signal derived from the tap 307 which next precedes the tap 308 along the delay line 19 in the direction of circulating signal travel. The signal receiving circuit 705 has a signal output with a duration and positional orientation determined by the setting and resetting signals derived respectively from the delay line taps 305 and 310. The signal receiving circuit 306 derives its input signal from the taps 701, 311 and 702, previously noted, and delivers a signal output having a duration equivalent to and simultaneous with the said input signal thereto. This last arrangement permits obtaining a signal output of any given duration up to a circulating signal period which signal output is obtainable during any portion of said circulating signal period by appropriately deriving signals along the length of the delay line 19.

While this invention has been described and illustrated with reference to a specific embodiment, it is to be understood that the invention is capable of various modifications and applications, not departing essentially from the spirit thereof, which will become apparent to those skilled in the art.

What is claimed is:

1. In combination, pulse transfer apparatus having input and output terminals, a signal transfer link characterized by a predetermined delay connected at one end with the output of said pulse transfer apparatus and at its other end with the input of said pulse transfer apparatus, a single pulse device connected with the input of said pulse transfer apparatus, a plurality of signal responsive devices operatively connected with spaced regions along said signal transfer link, and clearing apparatus connected between said signal transfer link and said pulse transfer apparatus.

2. In combination, a controlled single pulse device, a pulse forming apparatus having a signal clearing switch, a first input terminal operatively connected to said controlled single pulse device, a second input terminal and an output terminal, a signal delay line having an input terminal operatively connected to the output terminal of said pulse forming apparatus and an output terminal operatively connected to the second input terminal of said pulse forming apparatus, and a plurality of signal actuated devices operatively connected to said delay line at points along its length.

3. In combination; a signal line; a controlled single pulse device having an input lead operatively connected to said signal line; a signal gating unit having a first input lead operatively connected to said signal line, a second input lead operatively connected to said controlled single pulse device, a third input lead and an output lead; a pulse regenerating apparatus having an input lead operatively connected to the output of said signal gating unit and an output terminal, a signal delay line connected at its input end to the output of said pulse regenerating apparatus and connected at its output end to the third input lead of said signal gating unit, and a plurality of signal actuated devices operatively connected to spaced regions along said signal delay line.

4. In combination, a signal line, a controlled single pulse device operatively connected to said signal line, a plurality of signal gating units each operatively connected to said signal line and said controlled single pulse device, a plurality of pulse forming devices each operatively connected to one of said signal gating units, a plurality of signal delay networks each having an input terminal operatively connected to one of said pulse forming devices and an output terminal operatively connected to a corresponding one of said signal gating units, and a plurality of signal actuated devices operatively connected to each of said signal delay networks at different points.

5. In combination, a first signal line, a second signal line, a controlled single pulse device operatively connected to said first signal line, a signal gating unit operatively connected to said second signal line and said controlled single pulse device, a pulse forming apparatus operatively connected to said signal gating unit, a signal delay network having an input terminal operatively connected to said pulse forming apparatus and an output terminal operatively connected to said signal gating unit, and a plurality of signal actuated devices operatively connected to said signal delay network at different points.

6. In combination, a controlled single pulse device, an electronic valve pulse forming circuit comprising a tuned capacitor-inductor network coupled with an electrode structure having a plurality of elements including an input element operatively connected to said controlled single pulse device and an output element, a signal delay line comprising a plurality of capacitive and inductive elements including an input element operatively connected to the output element of said electronic valve pulse forming circuit and an output element operatively connected to the input element of said electronic valve pulse forming circuit, and a plurality of signal actuated devices operatively connected to said signal delay line at points along its length.

7. In combination, a controlled single pulse device, an electronic valve pulse forming circuit comprising a plurality of elements including an input element operatively connected to said controlled single pulse device and an output element, a signal delay line comprising a plurality of capacitive and inductive elements including an input element operatively connected to the output element of said electronic valve pulse forming circuit and an output element operatively connected to the input element of said electronic valve pulse forming circuit, a plurality of signal compensating networks comprising a plurality of capacitive and inductive elements operatively interposed in said signal delay line at intervals along its length, and a plurality of signal actuated devices operatively connected to said delay line at points along its length.

8. In combination, an electric signal propagating delay line, impulse transfer apparatus having an input and an output connected respectively with the output and input terminals of said delay line, an electric network having a plurality of mutually exclusive stable states, a first connection between said delay line and said electric network transmitting impulses initiating one of said stable states, and a second connection between said delay line and said electric network transmitting impulses initiating another of said stable states.

9. In combination, an electric transmission line provided with a substantially reflection free termination, a signal transfer link adapted to impress electric impulses on the input terminal of said transmission line and to receive electric impulses from the output terminal of said transmission line, an electric network having a plurality of mutually exclusive stable states, a first connection between said transmission line and said electric network transmitting impulses initiating one of said stable states, and a second connection between said transmission line and said electric network transmitting impulses initiating another of said stable states.

10. In signal recirculating apparatus, a signal line, an electric network having a plurality of mutually exclusive stable states wherein stimuli to one lead initiate one of said states and stimuli to a second lead initiate another of said states, a first electric valve having a cathode, a control electrode and an anode, a switching device alternatively removing a disabling bias from said control electrode and establishing said one of said states, a connection between said anode and said second lead, a second electric valve having a cathode, a control electrode and an anode, a differentiating circuit connecting said electric network and said second control electrode, a first transmission line connecting said second anode with a source of anode potential, a first unilateral conductor shunting the anode end of said first transmission line, a pulse forming electric network, a first conditionally operative signal transfer link jointly responsive to stimuli on said signal line and stimuli appearing at said second anode exciting said pulse forming electric network, a normally nonconductive third electric valve having a cathode, a control electrode and an anode, a connection delivering the output of said pulse forming electric network to said third control electrode, a second transmission line connected at one end to a conductor maintained at a relatively positive potential and at its other end to said third anode, a connection between said third cathode and a conductor maintained at a relatively negative potential, a second unilateral conductor connected between said third anode and a conductor maintained at a potential intermediate the rest potentials of said third anode and said third cathode, at least one signal responsive device connected with an intermediate point on said second transmission line, a signal dividing network connected to the supply end of said second transmission line, and a second conditionally operative signal transfer link jointly responsive to stimuli on said signal line and from said signal dividing network exciting said pulse forming network.

11. In combination, a coincidence gate having input and output terminals, a pulse generator for producing a continuous train of uniformly spaced pulses operatively connected to a first input terminal of said coincidence gate, a pulse device for producing a single impulse upon actuation operatively connected to a second input terminal of said coincidence gate, a signal delay line having an input terminal operatively connected to the output terminal of said coincidence gate and an output terminal operatively connected to a third input terminal of said coincidence gate and at least one signal actuated device operatively connected to said signal delay line intermediate its ends.

12. In combination, a coincidence gate having input and output terminals, a pulse generator for producing a continuous train of uniformly spaced pulses operatively connected to a first input terminal of said coincidence gate, a pulse device for producing a single impulse upon actuation operatively connected to a second input terminal of said coincidence gate, a signal delay line having an input terminal operatively connected to the output terminal of said coincidence gate and an output terminal operatively connected to a third input terminal of said coincidence gate, at least one signal actuated device operatively connected to said signal delay line intermediate its ends and clearing apparatus connected between said coincidence gate and said delay line.

13. In combination, a coincidence gate having input and output terminals, a signal line operatively connected to a first input terminal of said coincidence gate, a single pulse device operatively connected to a second input terminal of said coincidence gate, a signal transfer link characterized by a predetermined delay connected at one end with the output terminal of said coincidence gate and at its other end with a third input terminal of said coincidence gate, whereby coincidence of pulses from said signal line and either of said single pulse device or said signal transfer link causes emission of an output from said coincidence gate, a plurality of signal responsive devices operatively connected with spaced regions along said delay line and clearing apparatus connected between said signal transfer link and said coincidence gate.

14. In combination, a pulse generator for producing a continuous train of uniformly spaced pulses, a coincidence gate having a first input terminal operatively connected to said pulse generator and an output terminal, a pulse device for producing a single pulse upon actuation having an input terminal operatively connected to said pulse generator and an output terminal operatively connected to a second input terminal of said coincidence gate, a signal transfer link characterized by a predetermined delay connected at one end with the output terminal of said coincidence gate and at its other end with a third input terminal of said coincidence gate, whereby coincidence of pulses from said pulse generator and either of said pulse device or said signal transfer link causes emission of an output from said coincidence gate, at least one signal output line operatively connected to said signal transfer link and clearing apparatus connected between said coincidence gate and said signal transfer link.

References Cited in the file of this patent

UNITED STATES PATENTS

| Number | Name | Date |
|---|---|---|
| 2,199,634 | Koch | May 7, 1940 |
| 2,212,173 | Wheeler et al. | Aug. 20, 1940 |
| 2,403,561 | Smith | July 9, 1946 |
| 2,432,180 | Tourshou et al. | Dec. 9, 1947 |
| 2,436,808 | Jacobsen et al. | Mar. 2, 1948 |
| 2,444,741 | Loughlin | July 6, 1948 |
| 2,487,995 | Tucker | Nov. 15, 1949 |
| 2,503,909 | Hollingsworth | Apr. 11, 1950 |
| 2,510,987 | Levy | June 13, 1950 |
| 2,617,930 | Cutler | Nov. 11, 1952 |

OTHER REFERENCES

Electronics, pages 110 to 118.

Article, "Digital Computer Switching Circuits," by C. H. Page, September 1948.